July 28, 1959   J. I. HAMILL   2,897,382
DYNAMO-ELECTRIC MACHINES

Filed Feb. 4, 1958   3 Sheets-Sheet 2

INVENTOR
JOHN IVAN HAMILL

ATTORNEY

July 28, 1959  J. I. HAMILL  2,897,382
DYNAMO-ELECTRIC MACHINES
Filed Feb. 4, 1958  3 Sheets-Sheet 3

INVENTOR
JOHN IVAN HAMILL
ATTORNEY

United States Patent Office 2,897,382
Patented July 28, 1959

2,897,382

DYNAMO-ELECTRIC MACHINES

John Ivan Hamill, Cawston, near Rugby, England, assignor to The British Thomson-Houston Company Limited, London, England, a British company Application February 4, 1958, Serial No. 713,228

Claims priority, application Great Britain
February 4, 1957

5 Claims. (Cl. 310—64)

This invention relates to dynamo-electric machines and has particular application in large turbo alternators in which fluid cooling of the stator windings is employed.

In order to improve the cooling of such large machines it has been proposed to use liquids such as water to cool the stator windings. One such arrangement is described in the Electrical Journal of November 30, 1956, at page 1671, and a further arrangement is described in the A.I.E.E. Transactions paper No. 56–191. In both these arrangements liquid headers or bus-bars are employed and connections are made between the ends of hollow conductors forming the stator bars and the common headers. It is obviously necessary for the bars to be electrically insulated from the headers and thus considerable complication is involved in providing a large number of insulated connections for the liquid.

It is an object of the present invention to provide an arrangement in which the number of liquid carrying connections between conductors at different electrical potentials is very much reduced.

According to the present invention a dynamo-electric machine is provided with a winding comprising hollow conductors containing passageways along which cooling liquid can flow, said conductors being arranged to form at least two parallel paths for cooling liquid, and in which the passageways in conductors forming different paths are interconnected at points which in operation of the machine are at equal potentials so that a continuous circuit for cooling liquid is provided along one path and returning along another path.

The cooling liquid employed may, for example, be distilled water or oil.

The liquid cooling paths are preferably arranged to follow the electrical paths of the windings through a plurality of slots in the core of the dynamo-electric machine so that no voltage gradient occurs in the liquid passing from one slot to the next. In such a case heat exchangers are preferably provided in the liquid path between successive slots. A convenient position for the heat exchangers is in the noses of the winding coils. The heat exchangers themselves are cooled by a gas, such as hydrogen circulating at both ends of the machine.

In the case of a large alternator having a multiphase stator winding it is possible to provide each phase with a separate liquid cooling circuit which extends throughout all the conductors forming an individual phase. In such a case, the inlets and outlets of the cooling liquid can be arranged together at the neutral end of each phase. Alternatively, two or more closed cooling circuits can be provided for each phase of the windings.

The invention has particular application in stator windings consisting of hollow conductors forming a bar of the Roebel type.

In this arrangement the conductors are arranged in two stacks situated side-by-side in a slot, each conductor being transposed at intervals from one stack to the other. Over the length of the slot, however, a complete transposition occurs so that the individual conductors forming each stack at one end of a slot are in their same respective stack at the other end of the slot. Thus in a preferred embodiment of the invention cooling liquid is arranged to flow in one direction in the conductors forming a stack at an end of a slot and to flow in the reverse direction in the conductors forming the other stack.

In order that the invention may be more fully understood reference will now be made to the drawings accompanying this specification which show one embodiment of the invention. In the drawings:

Fig. 3 is a part longitudinal section of an alternator; while

Figure 1:
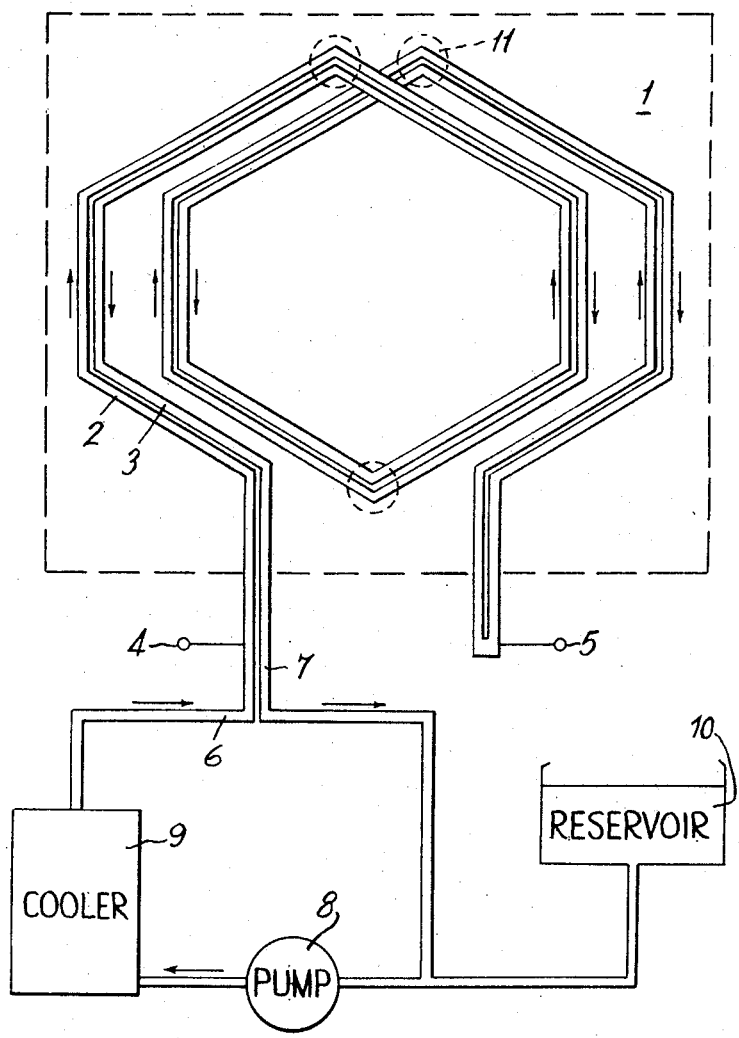
Fig. 1 shows diagrammatically a stator phase winding of an alternator.

Referring to Fig. 1, a phase winding of a multiphase stator is shown diagrammatically as comprising a two-turn coil 1 the conductors of which are hollow and contain passageways along which cooling liquid can flow. The conductors are arranged to provide two parallel paths 2 and 3 for cooling liquid extending longitudinally of the conductors. The winding extends from a neutral lead 4 to a phase output lead 5.

A cooling liquid, which may be distilled water or oil, is introduced into path 2 at an inlet 6 situated at the neutral end of the winding, the path of this cooling liquid extends the length of the phase winding through successive slots to the phase outlet end 5 where it is fed back into the other liquid path 3 and traverses the complete phase winding again in the reverse direction finally ending up at an outlet 7 at the neutral end of the winding. It will thus be appreciated that the liquid at inlet 6 and outlet 7 will be at the same electrical potential, namely neutral, and hence there will be no difficulty in recirculating the liquid by means of a pump 8 and a cooler 9. An adequate supply of cooling liquid may be maintained by reservoir 10 connected to the inlet side of pump 8. It will also be appreciated that since in passing from slot to slot the cooling liquid follows the path of the electrical conductor, there will be no potential gradient in the liquid as it passes from one slot to the next.

Figure 2:
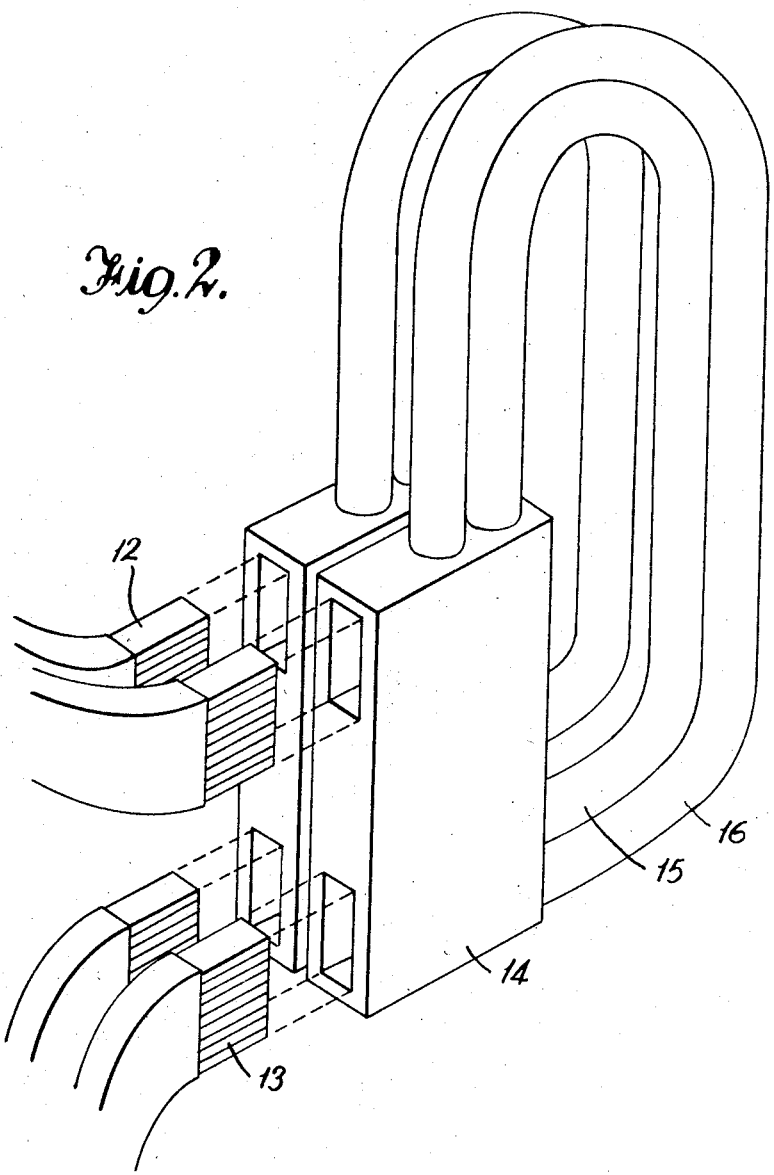
Fig. 2 shows a heat exchanger situated at the noses of the windings of Fig. 1.

Since in accordance with the described embodiment the liquid flows through successive slots in series and not as in previous arrangements through one slot only, it is desirable to provide heat exchangers at the ends of each slot. These are indicated by the dotted circles 11, in Fig. 1. These heat exchangers are shown in greater detail in Fig. 2, where it can be seen that they are situated at the noses of the winding coils. A winding 12 arrives at the nose from one slot and passes on to the next appropriate slot as indicated at 13. Electrical connection between windings 12 and 13 is provided by block 14. The path of the cooling liquid between conductor 12 and conductor 13 is, however, through two cooler tubes 15 and 16 the heat transfer area of which is increased by soldering onto them coils of coiled wire.

Figure 3:
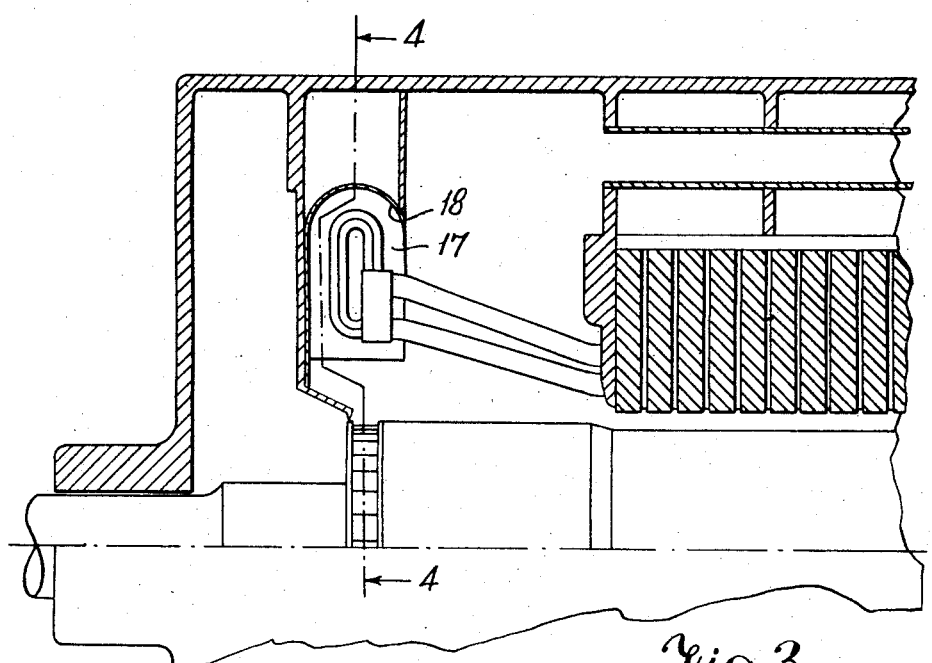

Fig. 3 is a part longitudinal section of an alternator showing the end of one stator winding and its associated heat exchanger 17. It will be appreciated that as some of the heat exchangers are at high potentials with respect to earth, an insulated shield 18 may be necessary on adjacent material which is at earth potential. In practice cooling gas circulated by means of a centrifugal fan will be provided to remove heat from the heat exchangers and it should be noted that electrical stress in the region of a heat exchanger is an advantage in assisting heat transfer therefrom since the presence of an electrical field is known to improve heat transfer in the gas and thus the heat transfer to the hydrogen circulating past the heat exchangers will be enhanced.

Figure 4:
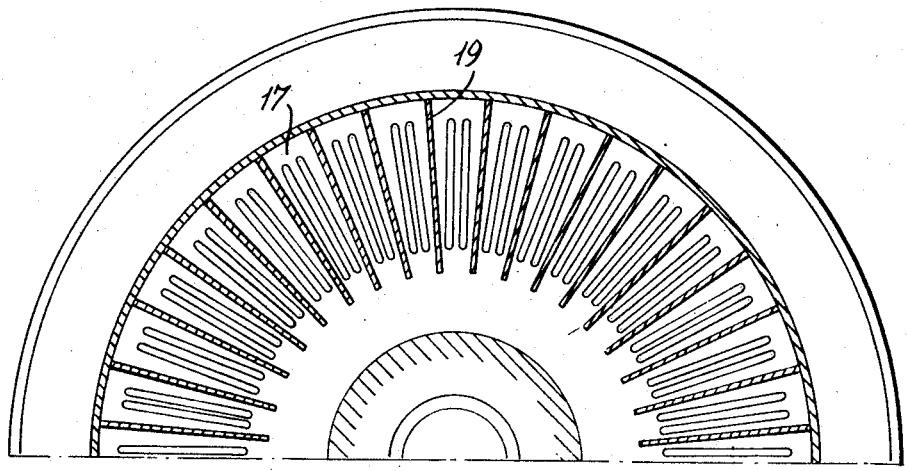
Fig. 4 is a part diametral section along the line 4—4 in Fig. 3.

Fig. 4 shows a section of an alternator along the line 4—4 of Fig. 3, and it will be seen that insulation 19 is introduced between each pair of heat exchangers to prevent arc over.

It will thus be appreciated that where the invention is applied to a conventional three phase stator winding only three connections to a source of liquid are required and these can be arranged to be at points of low electrical potential.

What I claim is:

1. A dynamo-electric machine having a multi-phase winding, each phase of said winding being formed by hollow conductors containing passageways for the flow of cooling liquid, said conductors being connected together to form two parallel paths for cooling liquid, an inlet and outlet for cooling liquid at one end of said phase winding, and an interconnection between said parallel paths at the opposite end of said phase winding.

2. A dynamo-electric machine having a multi-phase star-connected winding, each phase of said winding being formed by hollow conductors containing passageways for the flow of cooling liquid, said conductors being connected together to form two parallel paths for cooling liquid, an inlet and an outlet for cooling liquid at the neutral end of said phase winding and an interconnection between said parallel paths at the opposite end of said phase winding.

3. A dynamo-electric machine including a core having winding slots therein, a winding comprising a plurality of hollow conductor assemblies lying in said winding slots, each conductor assembly being connected at its end to a conductor assembly in a different slot to provide a continuous electrical path extending through a plurality of slots and each conductor assembly containing at least two separate passageways for cooling liquid, liquid flow connections at the ends of each slot between the passageways in successively connected conductor assemblies, said connections being arranged to provide two parallel paths for cooling liquid each extending through all the conductor assemblies of the winding in series, said liquid paths being connected together at one end of the winding and respectively connected to a liquid inlet and outlet at the other end of the winding.

4. A dynamo-electric machine including a core having winding slots therein, a winding comprising a plurality of hollow conductor assemblies lying in said winding slots, each conductor assembly being connected at its end to a conductor assembly in a different slot to provide a continuous electrical path extending through a plurality of slots and each conductor assembly containing at least two separate passageways for cooling liquid, liquid flow connections at the ends of each slot between the passageways in successively connected conductor assemblies, said connections being arranged to provide two parallel paths for cooling liquid each extending through all the conductor assemblies of the winding in series, said liquid paths being connected together at one end of the winding and respectively connected to a liquid inlet and outlet at the other end of the winding, and means for cooling said liquid flow connections.

5. A dynamo-electric machine including a core having winding slots, a winding comprising a plurality of hollow conductor assemblies lying in said winding slots, each conductor assembly being connected at its end to a conductor assembly in a different slot to provide a continuous electrical path extending through a plurality of slots and each conductor assembly containing at least two separate passageways for cooling liquid, liquid flow connections at the ends of each slot between the passageways in successively connected conductor assemblies, said connections being arranged to provide two parallel paths for cooling liquid each extending through all the conductor assemblies of the winding in series, said liquid paths being connected together at one end of the winding and respectively connected to a liquid inlet and outlet at the other end of the winding, and means for passing cooling gas over said liquid flow connections.

References Cited in the file of this patent

UNITED STATES PATENTS 2,695,368    Kilbourne _____ Nov. 23, 1954

FOREIGN PATENTS 557,216    Great Britain _____ Nov. 10, 1943